(12) United States Patent
Sinha et al.

(10) Patent No.: US 10,971,745 B2
(45) Date of Patent: Apr. 6, 2021

(54) CELL REVERSAL DIAGNOSTICS FOR A FUEL CELL STACK

(71) Applicant: GM Global Technology Operations LLC, Detroit, MI (US)

(72) Inventors: Manish Sinha, Rochester Hills, MI (US); Jingxin Zhang, Novi, MI (US); Andrew J. Maslyn, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 481 days.

(21) Appl. No.: 15/866,599

(22) Filed: Jan. 10, 2018

(65) Prior Publication Data

US 2019/0214664 A1 Jul. 11, 2019

(51) Int. Cl.

| | |
|---|---|
| *H01M 8/04664* | (2016.01) |
| *H01M 8/04992* | (2016.01) |
| *H01M 8/04537* | (2016.01) |
| *H01M 8/04746* | (2016.01) |
| *H01M 8/04858* | (2016.01) |
| *B60L 11/18* | (2006.01) |
| *H01M 8/0432* | (2016.01) |
| *H01M 8/04223* | (2016.01) |
| *B60L 58/30* | (2019.01) |

(52) U.S. Cl.
CPC ......... *H01M 8/04671* (2013.01); *B60L 58/30* (2019.02); *H01M 8/0491* (2013.01); *H01M 8/04238* (2013.01); *H01M 8/04365* (2013.01); *H01M 8/04552* (2013.01); *H01M 8/04649* (2013.01); *H01M 8/04753* (2013.01); *H01M 8/04992* (2013.01); *H01M 2250/20* (2013.01)

(58) Field of Classification Search
None
See application file for complete search history.

(56) References Cited

U.S. PATENT DOCUMENTS

2009/0110993 A1* 4/2009 Backhaus-Ricoult ............ H01M 8/249
429/433
2011/0178743 A1* 7/2011 Krause .............. H01M 8/04552
702/63

(Continued)

FOREIGN PATENT DOCUMENTS

JP 4998609 * 8/2012 ........ H01M 8/04589

*Primary Examiner* — Amanda J Barrow
(74) *Attorney, Agent, or Firm* — Quinn IP Law

(57) ABSTRACT

A fuel cell reversal event is diagnosed by integrating current density via a controller in response to determine an accumulated charge density. The controller executes a control action when the accumulated charge density exceeds a threshold, including recording a diagnostic code indicative of event severity. The control action may include continuing stack operation at reduced power capability when the accumulated charge density exceeds a first threshold and shutting off the stack when the accumulated charge density exceeds a higher second threshold. The event may be detected by calculating a voltage difference between an average and a minimum cell voltage, and then determining if the difference exceeds a voltage difference threshold. The charge density thresholds may be adjusted based on age, state of health, and/or temperature of the fuel cell or stack. A fuel cell system includes the stack and controller.

17 Claims, 2 Drawing Sheets

(56) References Cited

U.S. PATENT DOCUMENTS

| | | | |
|---|---|---|---|
| 2013/0059215 A1* | 3/2013 | Kawahara | H01M 8/04589 429/413 |
| 2013/0095405 A1* | 4/2013 | Kawahara | H01M 8/0494 429/431 |
| 2016/0141676 A1* | 5/2016 | Ogawa | H01M 8/04992 429/430 |
| 2019/0386323 A1* | 12/2019 | Fellows | H01M 8/04835 |

* cited by examiner

CELL REVERSAL DIAGNOSTICS FOR A FUEL CELL STACK

INTRODUCTION

Fuel cell stacks are energy conversion devices in which electricity is generated via a controlled electrochemical reaction between hydrogen and oxygen. A fuel cell may produce up to 1 volt of electricity, and therefore a large number of identically-configured fuel cells are typically assembled together to form the stack. The number and configuration of fuel cells ultimately determines the stack's power capability. Polymer electrolyte membrane/proton exchange membrane (PEM) fuel cells are a type of fuel cell commonly used to produce electricity in high-power applications such as power supplies used in vehicles, power plants, and buildings.

While generally providing a reliable and clean source of energy, fuel cells suffer at times from a condition known as "cell reversal". During periods of cell reversal, cell voltages may decrease due to anode starvation, e.g., a lack of hydrogen at the anode caused by a fuel feed malfunction or obstruction. Cell reversal is undesirable due to the increased likelihood of damage to the fuel cell and, as a result, a reduction in the expected lifespan of the fuel cell. Fuel cell systems therefore typically monitor cell voltage levels against a minimum voltage threshold to detect the cell reversal condition and, in response, limit operation of the fuel cell stack as a preventative action.

SUMMARY

A method is disclosed herein for diagnosing performance of a fuel cell in a fuel cell stack. Using the present method, a controller is able to discriminate, in real-time, between damaging and non-damaging cell reversal events. Additional time is thus afforded to the controller to enable remedial actions in addressing root causes of the cell reversal without necessarily shutting down the fuel cell stack as in existing approaches.

Detecting the cell reversal event may include calculating a voltage difference between an average and a minimum cell voltage of the fuel cell, with the cell reversal event detected when the calculated difference exceeds a voltage difference threshold.

A possible embodiment of the method includes integrating a current density of the fuel cell over time to determine an accumulated charge density, doing so in response to the detected cell reversal event. A controller executes one or more control actions when the accumulated charge density exceeds a calibrated threshold. The method may include using multiple such thresholds, with different control actions possibly being triggered, e.g., progressively, as each successive threshold is surpassed.

The control action may include recording a diagnostic code that is indicative of a severity of the detected cell reversal event. In such an embodiment, appropriate control actions may be threshold-specific, such as temporarily continuing operation of the fuel cell stack at a reduced power capability upon reaching a particular threshold, and possibly shutting off the fuel cell stack when the integrated charge density exceeds a higher threshold. Temporarily continuing operation of the fuel cell stack at a reduced power capability may include limiting current throughput of the stack for a calibrated duration and/or increasing flow of hydrogen and/or air into the stack.

The method may optionally include adjusting one or more calibrated charge density thresholds based on the age, state of health, and/or temperature of the fuel cell or the fuel cell stack.

A fuel cell system is also disclosed herein for use with a vehicle or other system. The fuel cell system includes a controller and the above-noted fuel cell stack having a plurality of fuel cells, with the controller having a processor in communication with the fuel cells. The processor is programmed with instructions for diagnosing the cell reversal event. Execution of the instructions causes the controller to detect the cell reversal event, integrate the current density over time in response to the detected threshold cell reversal event to thereby determine an accumulated charge density, and execute a control action when the accumulated charge density exceeds a calibrated charge density threshold.

The above-noted features and advantages and other features and advantages of the present disclosure are readily apparent from the following detailed description of the best modes for carrying out the disclosure when taken in connection with the accompanying drawings.

Figure 1:
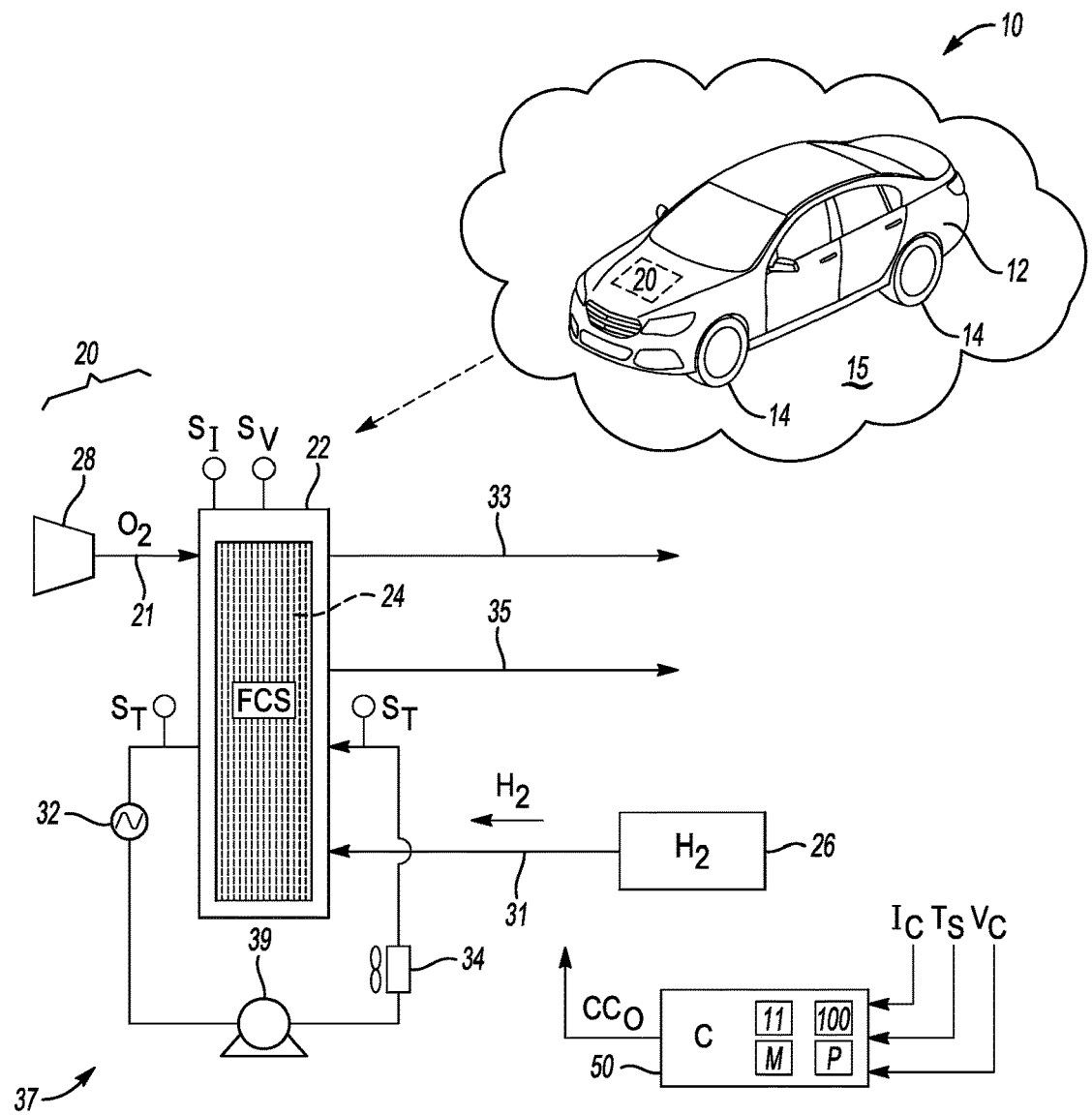
FIG. 1 is a schematic illustration of an example fuel cell system having a controller configured to perform a diagnosis process using an integral degradation model as set forth herein.

The present disclosure is susceptible to various modifications and alternative forms, and some representative embodiments have been shown by way of example in the drawings and will be described in detail herein. However, novel aspects of the disclosure are not limited to the particular forms illustrated in the appended drawings. Rather, the disclosure is to cover modifications, equivalents, combinations, and/or alternatives falling within the scope of the disclosure as defined by the appended claims.

DETAILED DESCRIPTION

Referring to the drawings, wherein like reference numbers refer to the same or like components in the several Figures, a fuel cell system 20 is depicted schematically in FIG. 1. The fuel cell system 20 may be used to generate electrical power for use in a host of applications. For instance, the fuel cell system 20 may be used for onboard power generation in the illustrated vehicle 10. The example vehicle 10 may include a vehicle body 12 and a set of drive wheels 14 in rolling frictional contact with a road surface 15. Electricity from the fuel cell system 20 in such a vehicle 10 could energize the drive wheels 14, e.g., by powering one or more electric machines (not shown) to ultimately rotate the wheels 14 and/or power onboard electrical systems. Vehicles other than the illustrated example motor vehicle 10 may benefit from use of the fuel cell system 20, e.g., rail vehicles/trains, aerospace vehicles, or marine vessels. Likewise, non-vehicular applications may be readily envisioned such as power plants, mobile platforms, robotic systems, or lighting systems, and therefore the illustrated vehicle 10 is intended as a non-limiting representative embodiment.

The fuel cell system 20 includes a fuel cell stack (FCS) 22 constructed of a plurality of fuel cells 24, with the fuel cells 24 depicted schematically in FIG. 1. The fuel cell stack 22 in an example configuration may be polymer electrolyte membrane/proton exchange membrane (PEM) device using hydrogen gas as a fuel source. The number and type of fuel cells 24 used in the construction of the fuel cell stack 22 may be expected to vary with the intended application, and therefore PEM devices are just one possible construction.

Regardless of the type of fuel cell stack 22 used in the fuel cell system 20, a diagnostic method 100 is executed by a controller (C) 50 online, i.e., in real-time aboard the example vehicle 10 or other system in which the fuel cell stack 22 is installed. In lieu of using fixed cell voltage thresholds as an indicator of cell reversal triggering preemptive shutdown of the fuel cell stack 22, execution of the method 100 enables the controller 50 to more accurately diagnose the true performance of the fuel cell stack 22. Such diagnostic results are accomplished using results of integral degradation logic 11 as set forth below. In this manner, the controller 50 is able to establish a more informed set of criteria for overall control of the fuel cell stack 22 in recovering from or responding to a cell reversal event. In other words, by eliminating false positive results in which a threshold decrease in cell voltage alone automatically triggers shutdown of the fuel cell stack 22, the controller 50 instead uses the integral degradation logic 11 to evaluate the potential of a given cell reversal event to damage the fuel cells 24 and/or the fuel cell stack 22.

Although omitted from FIG. 1 for illustrative simplicity, each fuel cell 24, as is known in the art, includes oppositely-positioned cathode and anode electrodes separated by a thin membrane, e.g., a perfluorosulfonic acid (PFSA) membrane. Such membranes function as a separator and solid electrolyte material to selectively transport hydrogen protons/cations through the fuel cell 24. A cathode-side diffusion media layer is present on the cathode side, and a cathode side catalyst layer provided between the membrane and the diffusion media layer. Likewise, an anode side diffusion media layer is provided on the anode side, with an anode side catalyst layer provided between the membrane and the diffusion media layer. The catalyst layers and the membrane may collectively define a membrane electrode assembly, as is well understood in the art. The porous diffusion media layers together provide for gas transport into and water transport out of the membrane electrode assembly.

In a typical fuel cell 24, a voltage sensor ($S_V$) connected between the cathode and anode is configured to measure an individual cell voltage (arrow $V_C$), a measurement that occurs as part of the method 100. The measured cell voltages (arrow $V_C$) for each of the various fuel cells 24, whether individually measured or averaged from a single stack voltage measurement, are ultimately communicated to the controller 50, either wirelessly or over individual circuit traces or transfer conductors. A current sensor ($S_I$) may also be used to measure a stack current (arrow $I_C$) of the fuel cell stack 22, as well as one or more temperature sensors ($S_T$) each measuring a stack temperature at an inlet and outlet of the fuel cell stack 22, with such measurements reported as temperature signals (arrow $T_S$) and used in the ongoing monitoring and control of the fuel cell stack 22.

Hydrogen gas (arrow $H_2$) from a fuel source 26 is provided to an anode side of the fuel cell stack 22 via a feed line 31. Anode exhaust exits the fuel cell stack 22 on an anode exhaust line 35. A compressor 28 provides inlet airflow, and thus oxygen ($O_2$) on a cathode input line 21 into the fuel cell stack 22. In a manner that is similar to the function of the anode exhaust line 35, cathode exhaust gas is output from the fuel cell stack 22 on a separate cathode exhaust line 33. The example fuel cell system 20 may also include a pump 39 that circulates heat transfer fluid through a thermal loop 37. A radiator 34 and a heater 32 located on the thermal loop 37 maintain a desired temperature of the fuel cell stack 22.

Still referring to FIG. 1, the controller 50 receives temperature signals (arrow $T_S$) from the temperature sensors ($S_T$) indicative of the temperature of the heat transfer fluid at the coolant inlet and outlet of the fuel cell stack 22. The controller 50 also receives the cell voltages (arrow $V_C$) as a voltage signal from the voltage sensors ($S_V$). In response, the controller 50 controls the overall operation of the radiator 34, the pump 39, and the heater 32. Additionally, the controller 50 is configured to control the speed of the compressor 28 and the flow of hydrogen gas (arrow H2) into the fuel cell stack 22 from the fuel source 26. In this manner, the controller 50 is able to regulate the power level being output from the fuel cell stack 22.

Outside of the general operational control of the fuel cell stack 22 of FIG. 1, the controller 50 performs the method 100 to monitor the fuel cell stack 22 in real-time for a cell reversal event, and then evaluates the severity of the cell reversal event based on results from the integral degradation logic 11. The controller 50 ultimately outputs control signals (arrow $CC_O$) to the fuel cell system 20 to regulate the fuel cell stack 22, including executing a control action with respect to the fuel cell stack 22. In order to perform the assigned diagnostic and control functions disclosed herein, the controller 50 is equipped with a processor (P) and memory (M). The memory (M) includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock and counter, analog-to-digital and digital-to-analog circuitry, and input/output circuitry and devices, as well as appropriate signal conditioning and buffer circuitry.

Figure 2A:
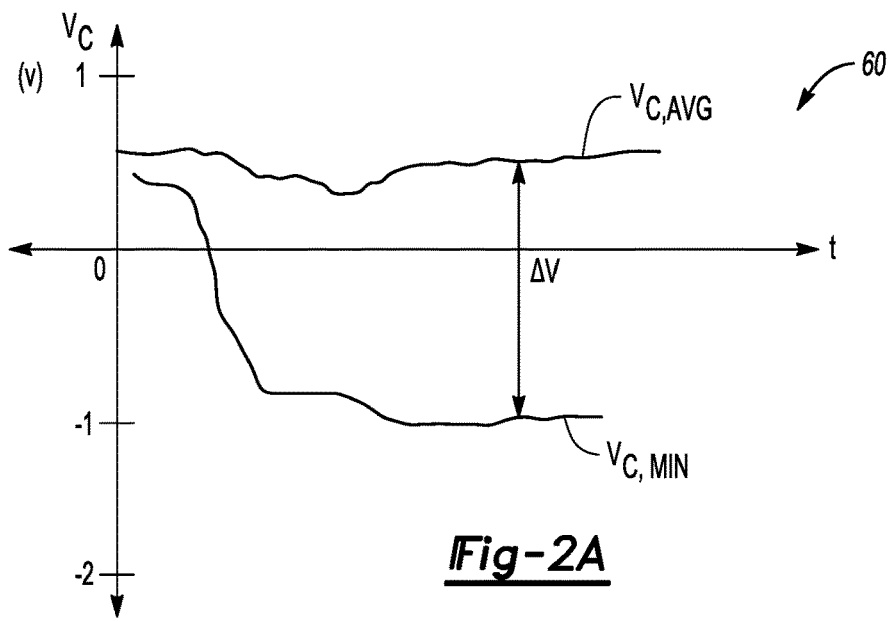
FIGS. 2A and 2B are representative time plots of cell voltages indicative of example anode and cathode starvation-based cell reversal conditions, respectively.
Figure 2B:
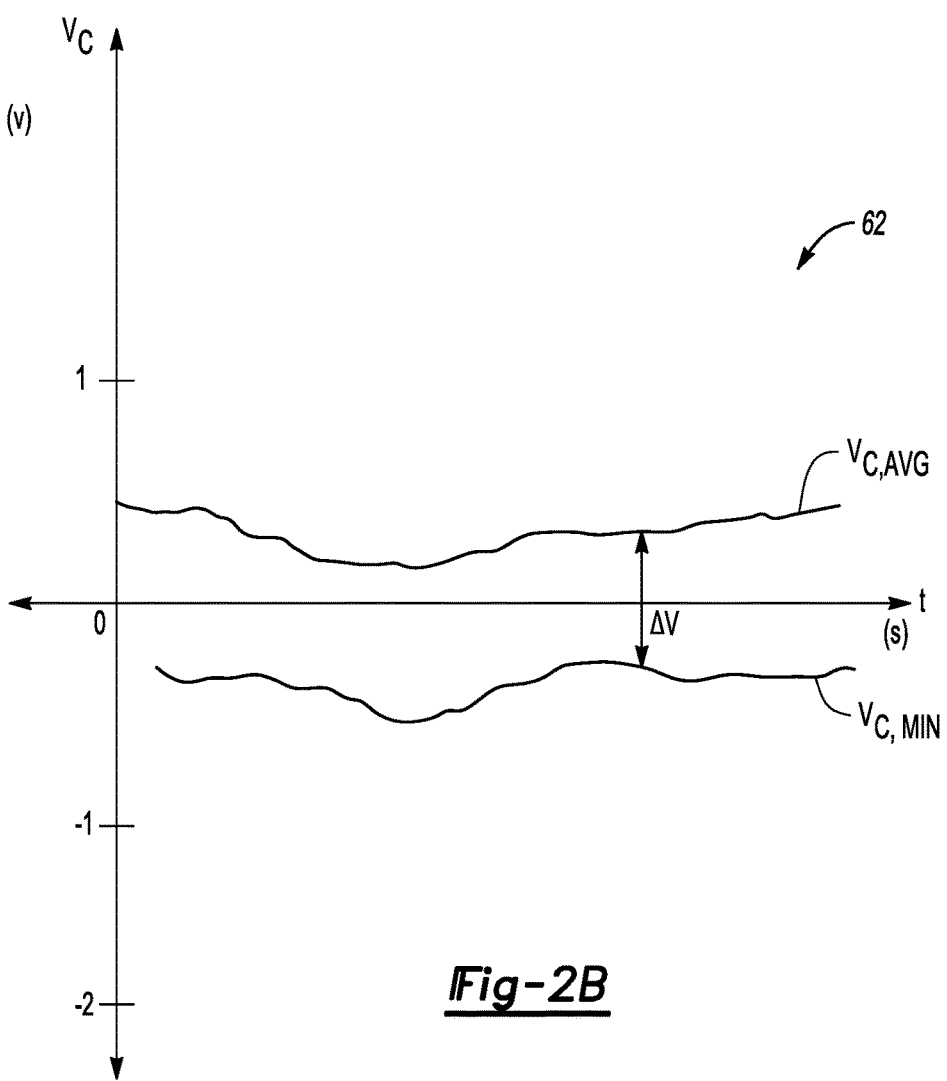

FIGS. 2A and 2B are representative time plots 60 and 62 of a minimum cell voltage ($V_{C, MIN}$) indicative of cell reversal due to anode and cathode starvation, respectively. The pattern of time plot 60 of FIG. 2A shows the minimum cell voltage ($V_{C, MIN}$), e.g., as measured by the respective voltage sensors ($S_V$) of FIG. 1, starting out at a low positive voltage level, such as about 0.5 V, and then quickly dropping to negative voltage level. Such a pattern is indicative of anode starvation, i.e., of a temporary or permanent discontinuation in a feed of the hydrogen gas (arrow $H_2$) from the fuel source 26 shown in FIG. 1. Such a cell reversal may, over time, damage the particular fuel cell 24 exhibiting the pattern of time plot 60, but at the same time may not pose an immediate shorting risk.

Cathode starvation as depicted in FIG. 2B may produce a sustained, negative minimum cell voltage ($V_{C, MIN}$). Such a voltage pattern may be seen during a period of voltage recovery in the fuel cell stack 22 of FIG. 1, for instance during an initial break-in/conditioning process or during ongoing operation of the fuel cell stack 22. Such a cell reversal is not usually damaging. Thus, of the two representative patterns in minimum cell voltage ($V_{C, MIN}$) shown in time plots 60 and 62 of FIGS. 2A and 2B, respectively, the controller 50 of FIG. 1 detects and diagnoses the severity of the particular cell reversal shown in FIG. 2A, i.e., anode starvation, and then takes an appropriate preventive action to protect the fuel cell stack 22 when necessary based on the diagnostic results.

As a theoretical basis underlying the present method 100, the potential damage to a given fuel cell 24 is considered herein to be load-dependent. Thus, careful evaluation of cell reversal severity using the controller 50 may allow the controller 50 to remedy the cell reversal event without necessarily resorting to immediate shutdown of the fuel cell stack 22. In other words, the controller 50 is configured to discriminate between damaging and non-damaging cell reversals, and also to comprehend a degradation rate in a diagnostic period before such a shutdown is executed.

In particular, the controller 50 of FIG. 1 performs its assigned diagnostic functions by considering a difference or voltage delta ($\Delta V$) between average cell voltage ($V_{C,AVG}$) and the minimum cell voltage ($V_{C,MIN}$) when detecting a cell reversal event. The controller 50 then uses the integral degradation logic 11 to integrate current over a timeframe commencing with detection of the cell reversal event, thereby determining an accumulated charge density. Above a charge density threshold, the controller 50 executes one or more control actions to help protect the fuel cell stack 22, which may entail recording a diagnostic code, limiting current throughput of the fuel cell stack 22 and/or shutting down the fuel cell stack 22 as needed, depending on the particular threshold that has been surpassed.

Figure 3:
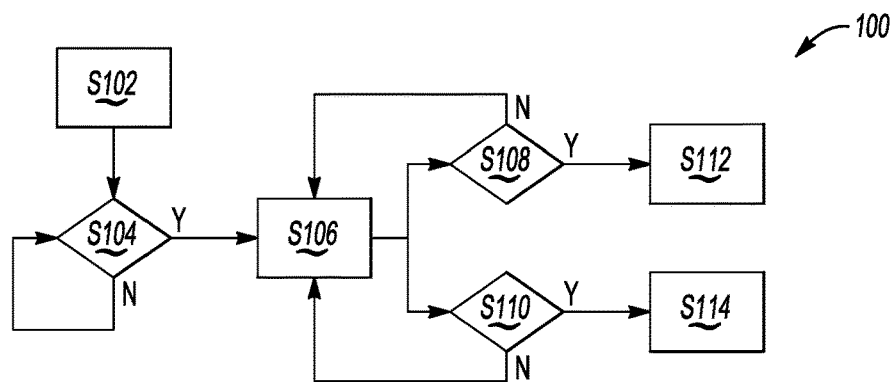
FIG. 3 is a flow chart describing an example embodiment of a method for diagnosing the fuel cell stack of FIG. 1.

FIG. 3 is a flowchart describing an example embodiment of the method 100 introduced above. Beginning with step S102, the controller 50 detects a requested start of the fuel cell stack 22, for instance a key-on event or ignition request in the example vehicle 10 of FIG. 1. In response to the requested start, the controller 50 may reset an accumulator of the integral degradation logic 11, i.e., an accumulated charge density value ranging upward from zero. The controller 50 determines an electrical charge density accumulated at the anode side of a given fuel cell 24 as shown in FIG. 1. The method 100 then proceeds to step S104.

At step S104, the controller 50 next receives and processes the cell voltages ($V_C$) from the voltage sensors ($S_V$) shown schematically in FIG. 1, doing so at a calibrated sampling rate. The controller 50 is configured to calculate the average cell voltage ($V_{C,AVG}$) noted above with reference to FIGS. 2A and 2B, and also to record and track the minimum cell voltages ($V_{C,MIN}$). As part of step S104, the controller 50 compares the calculated average cell voltage ($V_{C,AVG}$) to the minimum cell voltages ($V_{C,MIN}$), doing so in real-time.

In this manner, the controller 50 determines whether the voltage difference ($\Delta V$ of FIGS. 2A and 2B) exceeds a calibrated voltage difference threshold. A suitable example range for a calibrated threshold difference is about 1.0-1.2 V. However, other ranges or discrete values may be used depending on the configuration and power capability of the fuel cells 24. The method 100 proceeds to step S106 when the voltage difference ($\Delta V$) exceeds a calibrated threshold difference, with the controller 50 otherwise repeating step S104. The controller 50 therefore remains at step S104 until a subsequent ignition/key-off of the fuel cell system 20 of FIG. 1 terminates execution of the method 100, with the method 100 commencing anew at step S102 with the next key-on/ignition event.

Step S106 includes integrating the stack current density (j) over time, via the integral degradation logic 11 of FIG. 1, in response to a determination at step S104 that the voltage difference ($\Delta V$) exceeds the calibrated threshold difference. As used herein, "integrate" refers to mathematical integration in which the area under a curve is determined, which in the present approach equals the total accumulated charge density since onset of the calibrated threshold difference. That is, the controller 50 is configured to calculate the following:

$$C_{AN} = \int j \left[ \frac{A}{cm^2} \right] \cdot dt$$

where $C_{AN}$ is the accumulated charge density determined through integration of current density (j) over time (t) since onset of the threshold condition of step S104, with the current density (j) represented in amperes or Amps (A) per centimeter squared ($cm^2$). The method 100 then proceeds to steps S108 and S110.

Steps S108 and S110 may include comparing the accumulated charge density from step S106 to calibrated first and second charge density thresholds, respectively, with the first charge density threshold of step S108 being less than the second charge density threshold. The method 100 may proceed to step S112 from step S108 when the accumulated charge density exceeds the first charge density threshold, with the controller 50 otherwise repeating step S106. Similarly, the method 100 may proceed to step S114 from step S110 when the accumulated charge density exceeds the higher second charge density threshold, otherwise repeating step S106.

Steps S112 and S114 include executing a control action via the controller 50 with respect to the fuel cell stack 22 of FIG. 1. At step S112, for instance, the controller 50 may limit current throughput of the fuel cell stack 22, increase flow of hydrogen gas (arrow $H_2$) from the fuel source 26 of FIG. 1, or execute another suitable control action short of shutting down the fuel cell stack 22. The controller 50 may record a diagnostic code as part of step S112 indicative of the diagnostic result. Step S112 may continue for a calibrated duration, defaulting to step S114 when the cell reversal is not corrected by the actions of the controller 50, and/or repeat step S108 to determine if the first threshold remains exceeded.

Step S114 may be used by the controller 50 when the accumulated charge density is excessive relative to a calibrated charge density threshold. As with step S112, the controller 50 may record a diagnostic code as part of step S114 indicative of this diagnostic result. Since the second charge density threshold of step S110 is set at a level indicative of impending degradation of the fuel cell 24, however, the control action of step S114 may include automatic shutdown of the fuel cell stack 22 and/or the system 20 of FIG. 1. The second charge density threshold is dependent on the construction of the particular fuel cells 24 and fuel cell stack 22 used in constructing the fuel cell system 20 of FIG. 1. The speed at which accumulation to second charge density threshold occurs is dependent on power output of the fuel cell stack 22, e.g., an example limit of 0.9 Coulombs/$cm^2$ reached in less than 1 second (s) under full power may require 30-40 s under idle conditions.

As part of the approach of method 100, the controller 50 may also consider the age of the fuel cell 24, its state of health, temperature, and/or other factors such as the level of hydration of the fuel cell 24 and then adjust the charge density thresholds of steps S104, S108, and/or S110 over time based on such values. For instance, the location of a given fuel cell 24 within the fuel cell stack 22 relative to the feed line 31 of FIG. 1 may be used to adjust such charge density thresholds, with fuel cells 24 closer to the feed line 31 more likely to be hydrated than those located farther away. The thresholds may be relaxed at lower temperatures, as the fuel cell 24 may be able to sustain a higher charge density for a longer duration when at a lower temperature. Older fuel cells 24 tend to degrade in health and internal cell resistance over time, and therefore more stringent charge density thresholds may be used for such fuel cells 24. One possible approach to balancing the above-noted factors is a lookup table in memory (M) of the controller 50, which may be accessed by the processor (P) of FIG. 1 to determine the appropriate thresholds to use in steps S104, S108, and/or S110, e.g., with the values populating the lookup table determined as function of temperature, hydration, age, state of health, etc.

The above-described method 100 is intended to improve the performance of typical diagnostic approaches in which a fuel cell stack is proactively shut down based solely on the minimum cell voltage ($V_{C,MIN}$ of FIGS. 2A and 2B) being lower than a calibrated negative voltage for a threshold duration. By way of example, a minimum voltage of −0.8 V seen for more than 0.6 s, or a higher voltage of, e.g., −0.1 V for a much longer duration, e.g., 10s, may ordinarily trigger an automatic shutdown action. Therefore, use of the present method 100 may help eliminate unwarranted automatic shutdowns of the fuel cell stack 22 of FIG. 1 in the face of non-detrimental cell reversals, and thereby improve the reliability of the fuel cell system 20 without adversely affecting durability, performance, or structural integrity.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for diagnosing a cell reversal event of a fuel cell in a fuel cell stack, the method comprising:
   detecting the cell reversal event via a controller;
   integrating current density of the fuel cell over time in response to the detected cell reversal event, using the controller, to thereby determine an accumulated charge density;
   comparing the accumulated charge density to a first calibrated charge density threshold and a second calibrated charge density threshold, the second calibrated charge density threshold being greater than the first calibrated charge density threshold; and
   executing a control action with respect to the fuel cell stack when the accumulated charge density exceeds the first calibrated charge density threshold, including recording a diagnostic code in memory of the controller that is indicative of severity of the cell reversal event and temporarily continuing operation of the fuel cell stack at a reduced power capability when the accumulated charge density exceeds the first calibrated charge density threshold, and shutting off the fuel cell stack when the accumulated charge density exceeds the second charge density threshold.

2. The method of claim 1, wherein temporarily continuing operation of the fuel cell stack includes limiting current throughput of the fuel cell stack for a calibrated duration.

3. The method of claim 1, wherein temporarily continuing operation of the fuel cell stack includes increasing a flow of hydrogen to the fuel cell stack for a calibrated duration.

4. The method of claim 1, wherein detecting a cell reversal event includes calculating a voltage difference between an average cell voltage and a minimum cell voltage of the fuel cell, and thereafter determining whether the calculated voltage difference exceeds a voltage difference threshold.

5. The method of claim 1, further comprising: adjusting the first calibrated charge density threshold and/or the second calibrated charge density threshold via the controller based on an age or a state of health of the fuel cell or the fuel cell stack.

6. The method of claim 1, further comprising: adjusting the first calibrated charge density threshold and/or the second calibrated charge density threshold via the controller based on a temperature of the fuel cell or the fuel cell stack.

7. The method of claim 1, further comprising: using electricity from the fuel cell stack to energize drive wheels of a vehicle.

8. A fuel cell system comprising:
   a fuel cell stack having a plurality of fuel cells; and
   a controller having a processor in communication with the plurality of fuel cells and programmed with instructions for diagnosing a cell reversal event, wherein execution of the instructions causes the controller to:
      detect the cell reversal event of one of the plurality of fuel cells;
      integrate, over time, a current density of the fuel cell having the detected cell reversal event in response to detecting the cell reversal event, thereby determining an accumulated charge density; and
      execute a control action with respect to the fuel cell stack when the accumulated charge density exceeds a first calibrated charge density threshold, including recording a diagnostic code, via the controller, that is indicative of severity of the cell reversal event, and continuing operation of the fuel cell stack at a reduced power capability when the accumulated charge density exceeds the first calibrated charge density threshold and is less than a second charge density threshold, and shutting off the fuel cell stack when the accumulated charge density exceeds the second charge density threshold.

9. The system of claim 8, wherein the controller is configured to temporarily continue operation of the fuel cell stack by limiting current throughput of the fuel cell stack for a calibrated duration.

10. The system of claim 8, wherein the controller is configured to temporarily continue operation of the fuel cell stack by increasing a flow of hydrogen to the fuel cell stack.

11. The system of claim 8, wherein the controller is configured to detect the cell reversal event by calculating a voltage difference between an average cell voltage and a minimum cell voltage of each of the fuel cells, and thereafter comparing the calculated difference to a threshold voltage difference.

12. The system of claim 8, wherein the controller is configured to automatically adjust the first calibrated charge density threshold and/or the second calibrated charge density threshold over time based on an age or state of health of the fuel cell or the fuel cell stack.

13. The system of claim 8, the system further comprising: at least one temperature sensor configured to measure a temperature of the fuel cell stack, wherein the controller is configured to automatically adjust the first calibrated charge density threshold and/or the second calibrated charge density threshold based on the measured temperature.

14. A vehicle comprising:
a vehicle body;
a set of drive wheels positioned with respect to the vehicle body; and
a fuel cell system configured to deliver power to the drive wheels, the fuel cell system comprising:
  a fuel cell stack having a plurality of fuel cells; and
  a controller having a processor in communication with the plurality of fuel cells and programmed with instructions for diagnosing a cell reversal event by calculating a voltage difference between an average cell voltage and a minimum cell voltage of each of the fuel cells, and comparing the calculated voltage difference to a threshold voltage difference, wherein execution of the instructions causes the controller to:
    detect the cell reversal event of one of the plurality of fuel cells;
    integrate, over time, a current density of the fuel cell having the detected cell reversal event in response to detecting the cell reversal event, thereby determining an accumulated charge density; and
    execute a control action with respect to the fuel cell stack when the accumulated charge density exceeds a first calibrated charge density threshold, including:
      recording a diagnostic code indicative of severity of the cell reversal event, and continuing operation of the fuel cell stack at a reduced power capability when the accumulated charge density exceeds the first charge density threshold; and
      shutting off the fuel cell stack when the accumulated charge density exceeds a second charge density threshold that is greater than the first charge density threshold.

15. The vehicle of claim 14, wherein the controller is configured to temporarily continue operation of the fuel cell stack by limiting current throughput of the fuel cell stack for a calibrated duration and/or increasing a flow of hydrogen to the fuel cell stack.

16. The vehicle of claim 14, wherein the controller is configured to automatically adjust the first calibrated charge density threshold and/or the second calibrated charge density threshold over time based on an age or state of health of the fuel cell or the fuel cell stack.

17. The vehicle of claim 14, further comprising:
at least one temperature sensor configured to measure a temperature of the fuel cell stack, wherein the controller is configured to automatically adjust the first calibrated charge density threshold and/or the second calibrated charge density threshold based on the measured temperature.

* * * * *